Figure 1:
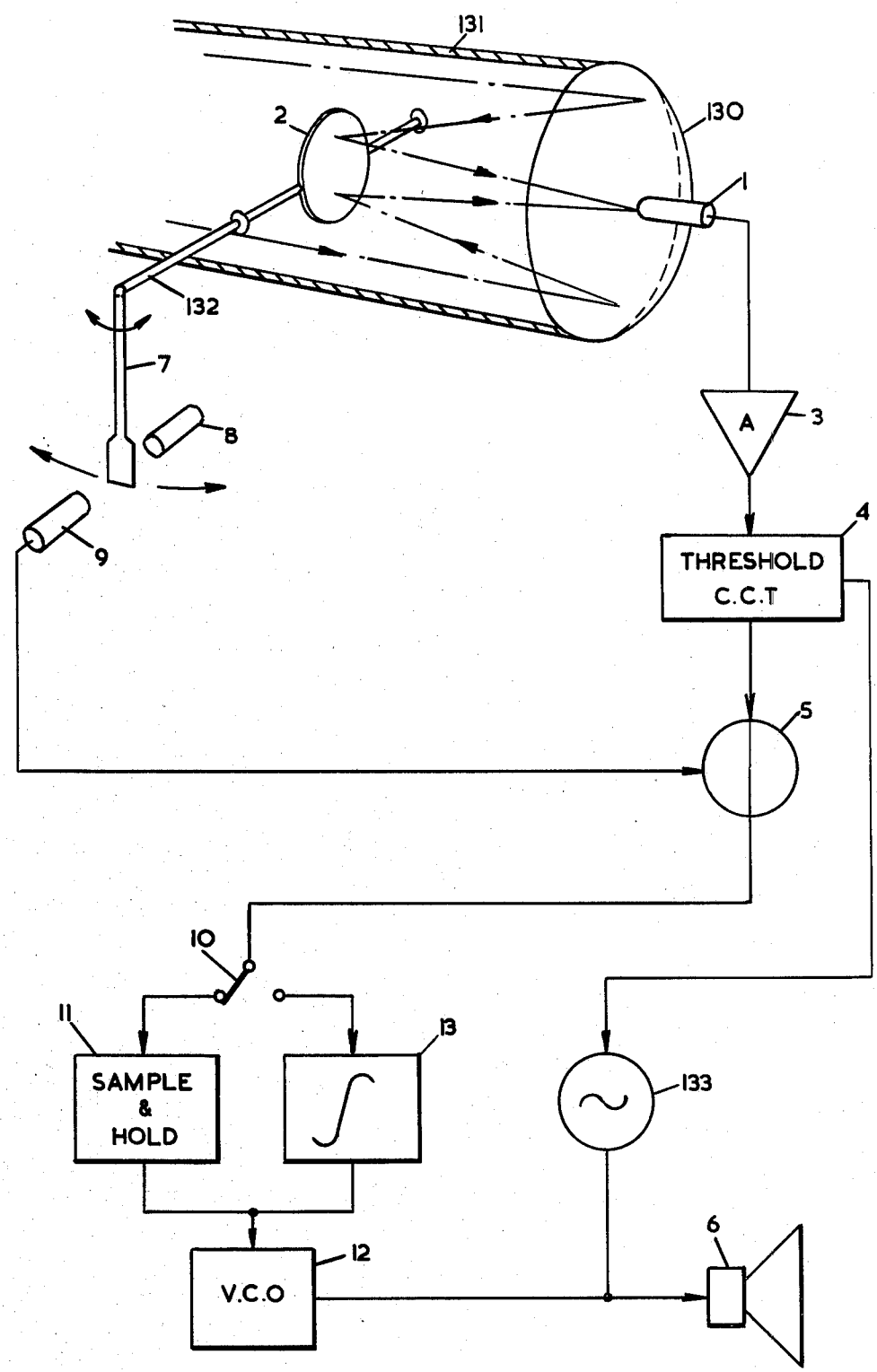

United States Patent [19]

Dore

[11] 4,317,998

[45] Mar. 2, 1982

[54] INFRA-RED LINE-SCANNING TARGET DETECTORS

[75] Inventor: Marcus J. Dore, Bournemouth, England

[73] Assignee: The Secretary of State for Defence in Her Britannic Majesty's Government of the United Kingdom of Great Britain and Northern Ireland, London, England

[21] Appl. No.: 694,030

[22] Filed: Jun. 10, 1976

[30] Foreign Application Priority Data

Jun. 18, 1975 [GB] United Kingdom ............... 26048/75

[51] Int. Cl.³ ............................................... G01J 1/00
[52] U.S. Cl. .................................... 250/347; 250/338; 250/342
[58] Field of Search ....................... 250/338, 342, 347; 356/141, 152

[56] References Cited

U.S. PATENT DOCUMENTS

| 2,976,419 | 3/1961 | Menke et al. | 250/338 |
| 3,054,899 | 9/1962 | McKnight et al. | 250/347 |
| 3,493,953 | 2/1970 | Taylor | 250/347 |
| 3,992,629 | 11/1976 | Chapman | 250/342 |

FOREIGN PATENT DOCUMENTS 2054323 12/1974 Fed. Rep. of Germany ...... 356/152

Primary Examiner—S. C. Buczinski
Attorney, Agent, or Firm—Stevens, Davis, Miller & Mosher

[57] ABSTRACT

Scanning radiation source detecting apparatus, comprising means for deriving a general response signal in response to radiation from any part of a field of view, and a central response signal in response to radiation from a central part of the field of view, with means for producing audio signals of a frequency dependent on the magnitude of the central response signal. The apparatus may produce a constant frequency signal in response to the general response signal, and the central response signal may be derived from the general response by a gate circuit controlled by a scanning mirror mechanism. The gate circuit may be connected to a voltage controlled oscillator by a sample-and-hold circuit or, by an integrating circuit. Alternatively the apparatus may comprise a light emitting diode energized by a radiation detector, an optical system arranged to form an image of the diode and two separate detectors placed in the optical system to form the general response and central response signals. One detector covers a small area at the center of the image plane; the other covers a larger area in a different plane, and intercepts only some of the rays directed to extreme positions on the image plane.

9 Claims, 3 Drawing Figures

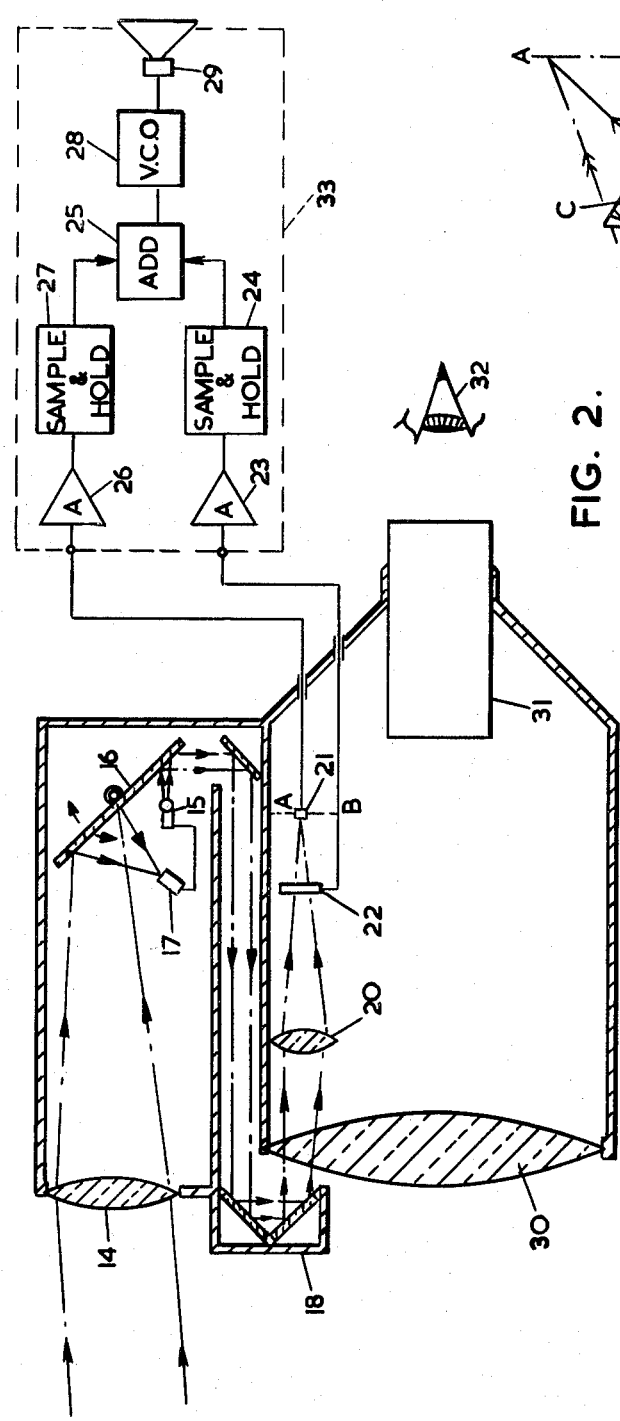
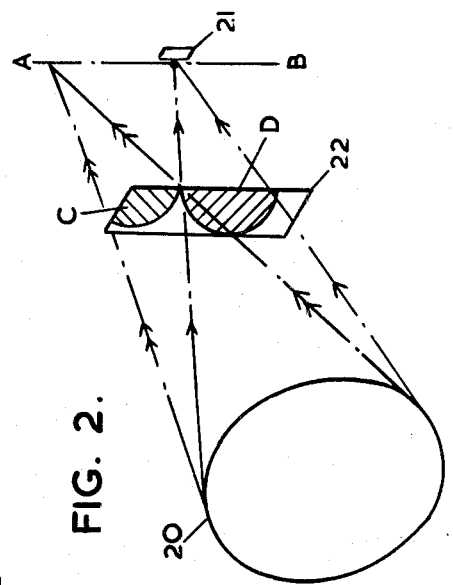
FIG. 2.
FIG. 3.

INFRA-RED LINE-SCANNING TARGET DETECTORS

The present invention relates to scanning radiation-source detector apparatus, and particularly to infra-red linescan surveillance apparatus. Such apparatus is commonly provided in combination with a telescope or binoculars, in many cases also with an image intensifier for use in starlight or semidark conditions. In general, the field-of-view of the telescope or binoculars is also scanned by a mirror which oscillates an image of the scene over a comparatively small infra-red radiation detector. When the portion of the image incident on the infra-red radiation detector contains infra-red radiation from any source appreciably warmer than its surroundings, the detector provides an electrical signal which is often used to energize a light-emitting semiconductor diode. The apparatus is arranged to reflect light from the diode via the scanning mirror into the optical system so that a user of the telescope or binoculars will see a spot of light superimposed on the position of the detected radiation source. This system has the disadvantage that the spot of light tends to obscure any visible detail at or near the source, especially at night, and yet may be difficult to see in bright sunlight. If a control is provided for adjusting the brightness of the spot, this gives the user another control to remember and another component which may fail.

U.S. patent application Ser. No. 574,543, filed May 6, 1975 (now abandoned) and U.S. patent application Ser. No. 801,541, filed May 26, 1977 describe detector apparatus which is arranged to give an audible indication of the detection of an infra-red radiation source and a distinctive audible signal dependent on the proximity of the source to the center of a field-of-view. In the said application the embodiments described show apparatus whereby the distinct audible signal is derived by comparing the time intervals between detections of the source on consecutive linescans.

It is an object of the present invention to provide scanning radiation-source detecting apparatus which will give audible indications of the detection of a radiation source which will assist an operator to locate the position of the source more accurately and perhaps also more quickly or more reliably.

According to the present invention there is provided scanning radiation-source detecting apparatus, comprising means for forming an image of a field-of-view, a radiation detector having an optical aperture considerably narrower than the said field-of-view, scanning means for causing the image of the field-of-view to move relatively across the optical aperture of the radiation detector, and audio-signal generating means for producing audio signals of a variable frequency dependent on the magnitude of the response of the radiation detector to radiation from a central area of the field-of-view. The apparatus preferably comprises means for deriving a general response signal in response to radiation received from any part of the field-of-view, and means for deriving a central response signal in response to radiation received from a central part of the field-of-view.

The audio-signal generating means may comprise a fixed-frequency audio oscillator and a variable-frequency audio oscillator connected to produce an audio signal of frequency dependent on the magnitude of the central response signal. The central response signal may be derived from the radiation detector output by a gate circuit controlled by the scanning means. The gate circuit may be connected to the variable-frequency oscillator by a sample-and-hold circuit or by an integrator circuit.

Alternatively, the audio-signal generating means may comprise a variable-frequency audio oscillator connected to provide signals of a frequency dependent on a summation of the general response signal and the central response signal. The apparatus may include a light-emitting semiconductor device connected to the output of the radiation detector, and an optical system placed to receive light from the device via the scanning mirror so that when the radiation detector receives radiation from any part of the field-of-view and causes the device to produce light, the scanning means directs this light into the optical system so as to illuminate a corresponding part of an image plane therein. The means for deriving the central response signal may then be a first light detector of comparatively small area placed at the center of the image plane, where it will be illuminated if a radiation source is detected in the center of the field-of-view. The means for deriving the general response signal may be a larger light detector placed in another plane so as to intercept only some of any light rays directed by the system towards extreme portions of the image plane. With this arrangement, when an operator sweeps the apparatus to bring its field-of-view across a radiation source, as the source comes on to the field-of-view it causes the light-emitting device to be energized while the scanning mirror is at or near an extreme position, which directs light from the device towards an extreme position in the image plane, and the large detector intercepts an increasing proportion of this light as the center of the field-of-view is brought nearer to the direction of the source, therefore producing a voltage which increases up to a maximum. Then as the center of the field-of-view comes close to the direction of the source, the small detector at the center of the image plane begins to receive light from the light-emitting device and produces an increasing output voltage until the field-of-view is centered on the source. The frequency of the oscillator is controlled by the sum of the detector outputs and therefore becomes increasingly high-pitched during this procedure, thereby giving the operator very clear and accurate indications enabling him to locate the direction of the source quickly and accurately.

Apparatus of the kind described in the preceding paragraph may be constructed by an adaptation of, or an addition to, an existing detector apparatus of the kind which already contains a light-emitting diode connected to its radiation detector. Two embodiments of the invention will now be described by way of example only and with reference to the accompanying drawings, of which:

FIG. 1 is a schematic diagram of an infra-red line-scanning surveillance apparatus, FIG. 2 is a schematic diagram of another form of infra-red line-scanning surveillance apparatus, and FIG. 3 is an explanatory perspective view of part of the detector of FIG. 2.

FIG. 1 shows a surveillance apparatus comprising a concave mirror 130 mounted at one end of a tube 131, so as to collect infra-red light and direct it towards a scanning mirror 2, so as to form an image which will be scanned across an infra-red radiation detector 1 mounted in the center of the mirror 130. The mirror 2 is mounted on a bar 132 which is carried in bearings in the walls of the tube 131; the bar 132 and mirror 2 are oscillated by a mechanical drive from an electric motor (not shown). The output of the radiation detector 1 is applied through an amplifier 3 to a threshold circuit 4, which simply serves to prevent background noise signals from being passed on to the rest of the circuit. Outputs from the threshold circuit 4 are applied to the analog signal input of an FET gate circuit 5 and to a control input of a fixed-frequency oscillator circuit 133.

The bar 132 also carries an arm 7 which oscillates with the bar 132 and moves between a light-emitting diode 8 and a light detector 9. The arm 7 intercepts the light from the diode 8 when the mirror 2 passes through the mid-point of its oscillatory motion. The output of the light detector 9 is connected through an inverting amplifier (not shown) to control the gate circuit 5 so that the gate circuit 5 will be enabled to pass signals from the threshold circuit 4 to a switch 10 for a short period in the center of each scanning cycle. The switch 10 has two alternative positions and is arranged to connect the output of the gate circuit 5 either to a sample-and-hold circuit 11 or to an integrating circuit 13; the outputs of both these circuits are connected to the control input of a voltage-controlled oscillator 12. Another part (not shown) of the switch 10 may be arranged to disable whichever one of the circuits 11 and 13 is not in use, if necessary. Audio signal outputs from the voltage-controlled oscillator 12 and the fixed-frequency oscillator 133 are connected to a loudspeaker 6.

When the apparatus is directed towards any landscape or other scene, the mirrors 130 and 2 form an image of the field-of-view which is scanned across the infra-red detector 1 by the oscillatory motion of the mirror 2. Any significant source of infra-red radiation in the field-of-view will cause a signal from the detector 1 to pass via the amplifier 3 and threshold circuit 4 to the fixed-frequency oscillator 133; hence causing the loudspeaker 6 to produce a fixed-frequency audio tone. This signal and the conseqent audiotone will be intermittent, occurring whenever the scanning motion of the mirror 2 directs the image of the radiation source onto the infra-red detector 1.

To locate the radiation source, an operator will direct the apparatus so that its field-of-view sweeps slowly across the scene. When this action brings the center of the field-of-view near to the radiation source, the output signal responses of the detector 1 will begin to occur during the periods (in the center of each scanning cycle) when the gate circuit 5 is enabled to pass signals to the switch 10. Hence increasing voltages are developed at the output of the gate circuit 5 and are applied via the switch 10 to one of the circuits 11 or 13.

The sample and hold circuit 11 and the integration circuit 13 are used as alternative smoothing circuits. The sample and hold circuit 11 has a fast rise characteristic giving immediate response to radiation; it samples the output of the gate circuit 5 at its peak and holds the sampled signal with a slow decay lasting over several scan periods. The integration circuit 13 integrates the whole energy of the gated signal pulses over several scan periods and thereby improves the signal-to-noise ratio in exchange for a delay in response. In either case the voltage applied to the voltage-controlled oscillator will rise to a maximum when the center of the field-of-view is pointed directly at the radiation source, and the loudspeaker 6 will produce another audio tone which rises in frequency as this condition is approached.

FIG. 2 shows an alternative form of surveillance apparatus in which an infra-red transmitting lens forms an image of the field-of-view, which is scanned by a rocking mirror 16 across an infra-red detector 17. The output from the detector 17 is connected to a light-emitting diode 15. The diode 15 is placed so that light from it will be reflected from the scanning mirror 16 through a periscope arrangement 18 into an optical system comprising part of a lens 30 and another lens 20.

The lens 30 and an eyepiece lens or image intensifier 31 form a telescope for visual surveillance by an operator whose viewpoint is indicated at 32. The lens 30 and 20 are arranged to form an image of the diode 15 on a line AB which is indicated by a broken line on the drawing. This image will appear at a part of the line AB depending on the position of the scanning mirror 16 when the diode 15 is energized by the output of the detector 17.

There are two light detectors 21 and 22 mounted in this optical system. One detector 21 covers a comparatively small area adjacent to the center of the line AB and on one side of the line AB; the other detector 22 is larger and placed considerably nearer to the lens 20 so as to intercept rays of light directed towards the other side of the line AB. This arrangement is more clearly shown in the perspective drawing FIG. 3.

Outputs from the detectors 21 and 22 are connected by amplifiers 26 and 23 to sample-and-hold circuits 27 and 24 respectively. Outputs from the sample-and-hold circuits 27 and 24 are connected by an analog signal summing circuit 25 to the control input of a voltage-controlled oscillator 28 which in turn is connected to a loudspeaker 29.

When the surveillance apparatus of FIG. 2 is directed towards a scene containing an infra-red radiation source and this source comes within the field-of-view of the apparatus, the infra-red radiation detector 17 and diode 15 will be energized at some point in each scanning cycle of the mirror oscillation, and illumination from the diode 15 will be focussed to a corresponding part of the line AB. When an operator sweeps the apparatus slowly across the scene, as the field-of-view reaches the radiation source and moves across it, the resulting image of the diode 15 appears at one extremity of the line AB and moves towards its center. When this image is near one extremity of the line AB, as indicated by the rays shown with double arrowheads in FIG. 3, the detector 22 will intercept only a quarter of the cone of rays directed towards the image on AB. As the center of the field-of-view is brought nearer to the radiation source and the image of the diode 15 approaches the center of AB, the proportion of the illumination intercepted by detector 22 rises to a maximum of approximately one-half; thus the output voltage of the sample-and-hold circuit 24 also rises to a maximum. When the center of the field-of-view comes close to the radiation source, the smaller detector 21 begins to receive illumination from the diode 15, and provides a signal which also increases to a maximum. The resulting output from the circuit 27 is added to that of the circuit 24. The sum of the voltages from the circuits 27 and 24 controls the frequency of the oscillator 28, causing the loudspeaker 29 to produce a tone which increases in frequency during the process, giving the operator very clear and accurate guidance and thereby assisting him to locate the radiation source quickly and accurately.

The apparatus of FIG. 2 may be constructed by a modification of and additions to an infra-red linescan surveillance apparatus of known form, wherein the diode 15 may be a diode originally provided for superimposing a spot of light on the position of an infra-red radiation source in the view seen through the telescope. Alternatively the apparatus may be made independent of and additional to any telescope. The apparatus may be arranged with the line AB either horizontal or vertical.

The apparatus of FIG. 1 is preferably aligned with, and either attached to or moved synchronously with a telescope or binocular apparatus so that the operator can also visually inspect the area where any radiation source has been located.

I claim:

1. Scanning radiation-source detecting apparatus, comprising
   means for forming an image of a field-of-view,
   a radiation detector having an optical aperture considerably narrower than the said field-of-view,
   scanning means for causing the image of the field-of-view to move relatively across the optical aperture of the radiation detector,
   means for deriving a general response signal in response to radiation received from any part of the field-of-view,
   means for deriving a central response signal in response to radiation received from a central part of the field-of-view, and
   audio-signal generating means for producing audio signals of a variable frequency dependent on the magnitude of the response of said radiation detector to radiation from the central area of the field-of-view, said audio-signal generating means comprising a fixed-frequency audio oscillator controlled by the general response signal and a variable-frequency audio oscillator connected to produce an audio signal of a frequency dependent on the magnitude of the central response signal.

2. Apparatus as claimed in claim 1 and wherein the means for deriving the said general response signal comprises a connection to the radiation detector and the means for deriving the said central response signal comprises a gate circuit controlled by the scanning means and connected to pass signals from the radiation detector only when the scanning means is directing a central part of the image of the field-of-view onto the optical aperture of the radiation detector.

3. Apparatus as claimed in claim 2 and comprising a sample-and-hold circuit connected to receive the output of the gate circuit and to control the variable-frequency oscillator.

4. Apparatus as claimed in claim 2 and comprising an integrating circuit connected to receive the output of the gate circuit and to control the variable-frequency oscillator.

5. Scanning radiation-source detecting apparatus, comprising
   means for forming an image of a field-of-view,
   a radiation detector having an optical aperture considerably narrower than the said field-of-view,
   scanning means for causing the image of the field-of-view to move relatively across the optical aperture of the radiation detector,
   means for deriving a general response signal in response to radiation received from any part of the field-of-view,
   means for deriving a central response signal in response to radiation received from a central part of the field-of-view, and
   audio-signal generating means for producing audio signals of a variable frequency dependent on the magnitude of the response of said radiation detector to radiation from the central area of the field-of-view, said audio-signal generating means comprising a variable-frequency audio oscillator connected to produce audio signals of a frequency dependent on the magnitude of a summation of the general response signal and the central response signal.

6. Apparatus as in claim 5, and comprising a light-emitting semiconductor device connected to the output of the radiation detector and an optical system placed to receive light from the light-emitting semiconductor device via the scanning means so that whenever the radiation detector receives radiation from a particular part of the field-of-view it causes the device to produce light which is directed by the scanning means into the optical system so as to illuminate a corresponding part of an image plane therein, and wherein the means for deriving the said central response signal comprises a first light detector of comparatively small area placed substantially at the center of the image plane in the said optical system, where the optical system will form an image of the device if it is energized while the scanning means is directing the central part of the field-of-view onto the radiation detector, and the means for deriving the said general response signal comprises a second light detector of comparatively large area, placed to receive light directed by the optical system towards a wider area of the image plane.

7. Apparatus as claimed in claim 6 and wherein the second light detector is placed at some distance from the image plane and is of such a size that it will intercept only some of the rays of light directed by the optical system towards extreme positions in the image plane.

8. Apparatus as claimed in claim 6 and comprising a first sample-and-hold circuit connected to receive the output of the first light detector, a second sample-and-hold circuit connected to receive the output of the said second light detector, and an analog-voltage summing circuit connected to receive outputs from both sample-and-hold circuits and to control the variable-frequency oscillator.

9. Scanning radiation-source detecting apparatus comprising
   means for forming an image of a field-of-view,
   a radiation detector having an optical aperture considerably narrower than the said field-of-view,
   scanning means for causing the image of the field-of-view to move relatively across the optical aperture of the radiation detector,
   means for deriving a general response signal in response to radiation received from any part of the field-of-view,
   means for deriving a central response signal in response to radiation received from a central part of the field-of-view, and
   audio-signal generating means for producing audio signals dependent on the magnitude of said general response signal, said audio signals having a component whose frequency depends on the magnitude of said central response signal.

* * * * *